US007519813B1

United States Patent
Cox et al.

(10) Patent No.: US 7,519,813 B1
(45) Date of Patent: Apr. 14, 2009

(54) SYSTEM AND METHOD FOR A SIDECAR AUTHENTICATION MECHANISM

(75) Inventors: Benjamin T. H. Cox, Pittsburgh, PA (US); Michael Kazar, Pittsburgh, PA (US); Daniel S. Nydick, Wexford, PA (US); Richard N. Sanzi, Jr., Wexford, PA (US); Michael Eisler, Colorado Springs, CO (US)

(73) Assignee: Network Appliance, Inc., Sunnyvale, CA (US)

( * ) Notice: Subject to any disclaimer, the term of this patent is extended or adjusted under 35 U.S.C. 154(b) by 621 days.

(21) Appl. No.: 10/910,164

(22) Filed: Aug. 2, 2004

(51) Int. Cl.
*H04L 9/00* (2006.01)
*H04L 9/32* (2006.01)
*G06F 7/04* (2006.01)
*G06F 17/30* (2006.01)
*G06F 15/16* (2006.01)

(52) U.S. Cl. .................... 713/165; 713/166; 713/170; 726/10; 726/28

(58) Field of Classification Search .............. 713/165, 713/166, 170; 726/10, 28
See application file for complete search history.

(56) References Cited

U.S. PATENT DOCUMENTS

| 6,006,018 | A | * | 12/1999 | Burnett et al. ............. 709/219 |
| 7,360,034 | B1 | * | 4/2008 | Muhlestein et al. ......... 711/148 |
| 2002/0116593 | A1 | | 8/2002 | Kazar et al. |
| 2002/0120660 | A1 | * | 8/2002 | Hay et al. .................... 709/100 |
| 2003/0093413 | A1 | * | 5/2003 | Dettinger et al. .............. 707/3 |
| 2003/0135578 | A1 | * | 7/2003 | Banga et al. ................. 709/215 |

OTHER PUBLICATIONS

Kher, Vishal et al. "Securing Distributed Storage: Challenges, Techniques, and Systems", Nov. 2005.*
U.S. Appl. No. 10/035,664, filed Dec. 28, 2001, Muhlestein et al.

* cited by examiner

*Primary Examiner*—Michael J Simitoski
(74) *Attorney, Agent, or Firm*—Cesari and McKenna, LLP

(57) ABSTRACT

A system and method for authenticating an unauthenticated file level protocol using a sidecar authentication mechanism. A client transmits an authentication ticket, UID and list of network addresses to an authentication daemon of a storage system. The authentication daemon verifies the user identity and generates a file system credential that is stored in a cache indexed by an authentication tuple. Received data access operations from a client are compared to authentication tuples by UID and network address and the file system utilizes the stored credential for processing the data access operation.

13 Claims, 10 Drawing Sheets

SYSTEM AND METHOD FOR A SIDECAR AUTHENTICATION MECHANISM

FIELD OF THE INVENTION

The present invention relates to file-level protocol authentication and, in particular, to authentication for file-level protocols operable with a storage system.

BACKGROUND OF THE INVENTION

A storage system is a computer that provides storage service relating to the organization of information on storage devices, such as disks. The storage system may be deployed within a network attached storage (NAS) environment and, as such, may be embodied as a file server. The file server or filer includes a storage operating system that implements a file system to logically organize the information as a hierarchical structure of directories and files on the disks. Each "on-disk" file may be implemented as a set of data structures, e.g., disk blocks, configured to store information. A directory, on the other hand, may be implemented as a specially formatted file in which information about other files and directories are stored.

A filer may be further configured to operate according to a client/server model of information delivery to thereby allow many clients to access files stored on a server, e.g., the filer. In this model, the client may comprise an application, such as a database application, executing on a computer that "connects" to the filer over a computer network, such as a point-to-point link, shared local area network (LAN), wide area network (WAN), or virtual private network (VPN) implemented over a public network such as the Internet. Each client may request the services of the file system on the filer by issuing file system protocol messages (in the form of packets) to the filer over the network.

A common type of file system is a "write in-place" file system, an example of which is the conventional Berkeley fast file system. In a write in-place file system, the locations of the data structures, such as inodes and data blocks, on disk are typically fixed. An inode is a data structure used to store information, such as meta-data, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not over-write data on disks. If a data block on disk is retrieved (read) from disk into memory and "dirtied" with new data, the data is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. A particular example of a write-anywhere file system that is configured to operate on a filer is the SpinFS file system available from Network Appliance, Inc. of Sunnyvale, Calif. The SpinFS file system is implemented within a storage operating system of a filer having a overall protocol stack and associated disk storage.

Disk storage is typically implemented as one or more storage "volumes" that comprise physical storage disks, defining an overall logical arrangement of storage space. Currently available filer implementations can serve a large number of discrete volumes ($_{150}$ or more, for example). Each volume is associated with its own file system and, for purposes hereof, volume and file system shall generally be used synonymously. The disks within a volume are typically organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate caching of parity information with respect to the striped data. In the example of a SpinFS file system, a RAID 4 implementation may be advantageously employed. This implementation specifically entails the striping of data across a group of disks, and separate parity caching within a selected disk of the RAID group. As described herein, a volume typically comprises at least one data disk and one associated parity disk (or possibly data/parity partitions in a single disk) arranged according to a RAID 4, or equivalent high-reliability, implementation.

The filer or storage system may be configured to operate with the Network File System (NFS) protocol to thereby enhance the utility of the system for networking clients. The NFS protocol is typically utilized by Unix-based clients to access data sets served by a conventional NFS server of the storage system. However, a noted disadvantage of the NFS protocol is that it lacks strong authentication mechanisms. That is, a client may send a user identification value (UID) within a conventional NFS credential to the storage system, which simply asserts that UID with no confirmation that the client is the user identified by the asserted UID. As ownership and permissions of files within the storage system are determined by UID, an unauthorized person may gain access to the NFS server by simply asserting a known UID in an NFS data access request directed to the server.

One technique for improving the authentication of NFS requests is the use of NFS-Kerberos. In a conventional NFS-Kerberos implementation, the client transmits a conventional Kerberos ticket to the NFS server of the storage system to assert its name, and the storage system constructs an appropriate file system credential from the asserted Kerberos ticket. A noted disadvantage of NFS-Kerberos is that all clients communicating with the NFS server must support NFS-Kerberos as a Kerberos ticket is inserted into each NFS request sent to the server. Currently, only a very small number of clients support NFS-Kerberos, thereby limiting its usefulness.

SUMMARY OF THE INVENTION

The disadvantages of the prior art are overcome by providing a lightweight "side car" authentication mechanism that improves the security of file-level protocol access in a storage system environment. As used herein, the term "sidecar authentication mechanism" denotes the use of a client authentication program (CAP) to transmit an appropriate authentication ticket from the client to a server process running on the storage system without using the file-level protocol. The server process interacts with an authentication process to authenticate the client request and construct a storage system credential from the authentication ticket. The storage system credential is thereafter used to service further file-level requests from the client (until the credential expires) to thereby improve authentication of such file-level protocol access requests. In the illustrative embodiment, the storage system is embodied as a node configured to provide storage service and interoperate with other nodes as a cluster. The nodes comprise various functional components that cooperate to provide a distributed file system (SpinFS) architecture of the cluster. In addition, the server process may include an authentication daemon executing on the node and the file level protocol is illustratively the NFS protocol.

Operationally, the client first acquires an authentication ticket, such as a Kerberos credential, using a conventional authentication technique. The client then utilizes the CAP to transmit the Kerberos ticket to the authentication daemon, which uses that credential to generate the storage system credential, e.g., a SpinFS credential, and places this generated credential in a cache. The cache is maintained in a memory of the node and is also propagated to a replicated database (RDB), which is shared among all nodes of a cluster. Notably, the SpinFS credentials are accessed in the cache by authentication tuples, each of which comprises a UID, a network address of the client and a virtual server id (VSID). Once the SpinFS credential has been generated and stored in an appropriate entry in the cache, future NFS requests issued from the network address of the client utilize the cached credential instead of a conventional NFS credential included within the requests.

Specifically, upon receipt of the data access request from the client, a file protocol module, e.g. an NFS server executing on the node, acquires the appropriate SpinFS credential by indexing into the cache using the authentication tuple associated with the UID and network address of the received request. The NFS server then processes the data access request using the credential. If no credential is found in the cache, the request may either be denied or may be processed using a conventional unauthenticated NFS technique. In accordance with one embodiment of the present invention, an authentication level or strength value is assigned to each data access request. Unauthenticated requests are assigned a minimum authentication strength value and, in the illustrative embodiment, data access requests utilizing the sidecar mechanism of the present invention are assigned an authentication strength value that is higher than the unauthenticated NFS technique but lower than other strongly-authenticated access mechanisms. Administrators may use various system configurations to limit access to users based on their authentication strength.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Cluster Environment

Figure 1:
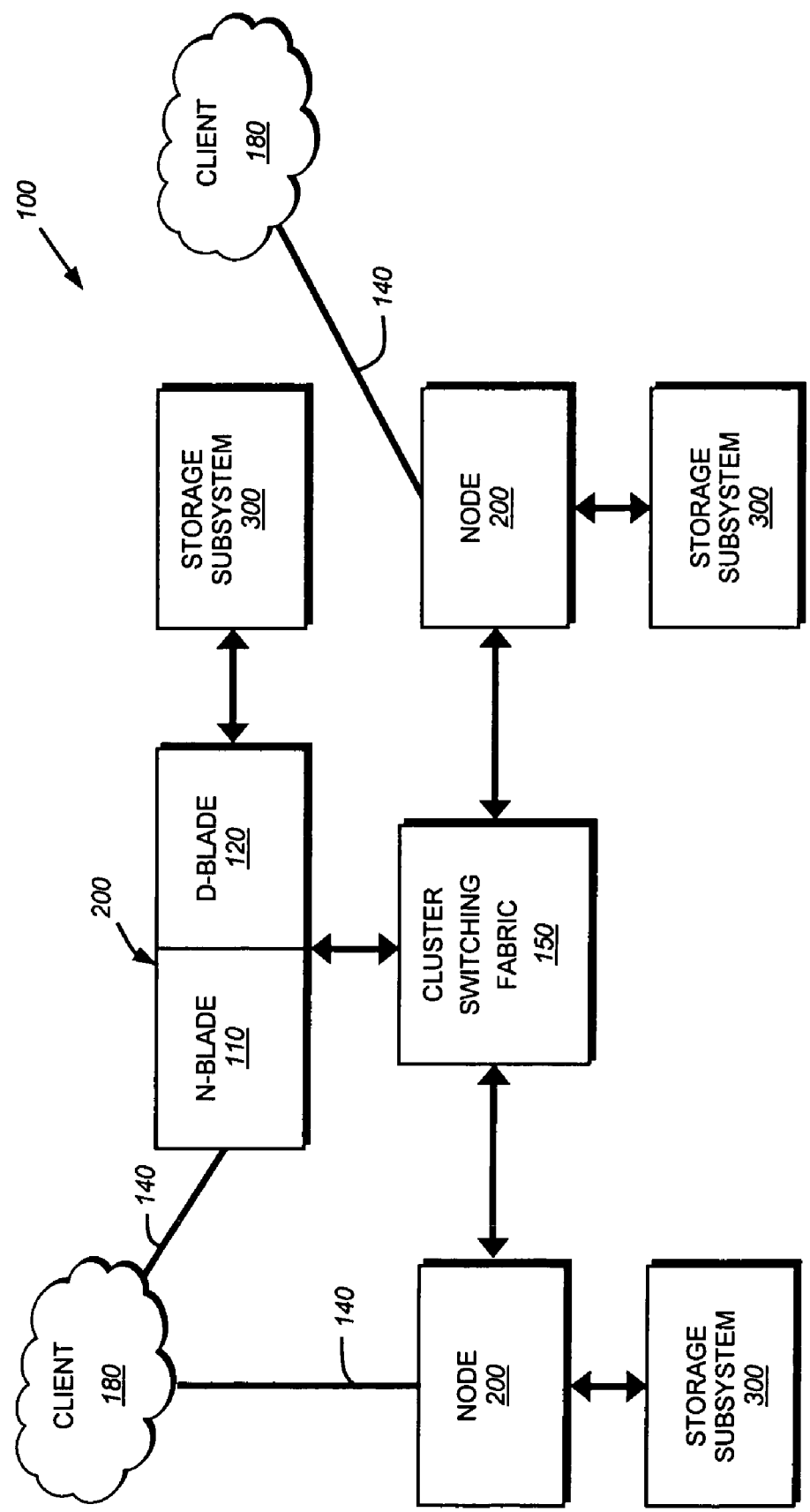
FIG. 1 is a schematic block diagram of a plurality of nodes interconnected as a cluster that may be advantageously used in accordance with an embodiment of the present invention.

FIG. 1 is a schematic block diagram of a plurality of nodes 200 interconnected as a cluster 100 and configured to provide storage service relating to the organization of information on storage devices of a storage subsystem. The nodes 200 comprise various functional components that cooperate to provide a distributed Spin File System (SpinFS) architecture of the cluster 100. To that end, each SpinFS node 200 is generally organized as a network element (N-blade 110) and a disk element (D-blade 120). The N-blade 110 includes a plurality of ports that couple the node 200 to clients 180 over a computer network 140, while each D-blade 120 includes a plurality of ports that connect the node to a storage subsystem 300. The nodes 200 are interconnected by a cluster switching fabric 150 which, in the illustrative embodiment, may be embodied as a Gigabit Ethernet switch. The distributed SpinFS architecture is generally described in U.S. Patent Application Publication No. US 2002/0116593 titled Method and System for Responding to File System Requests, by M. Kazar et al. published Aug. 22, 2002.

B. Storage Systems

Figure 2:
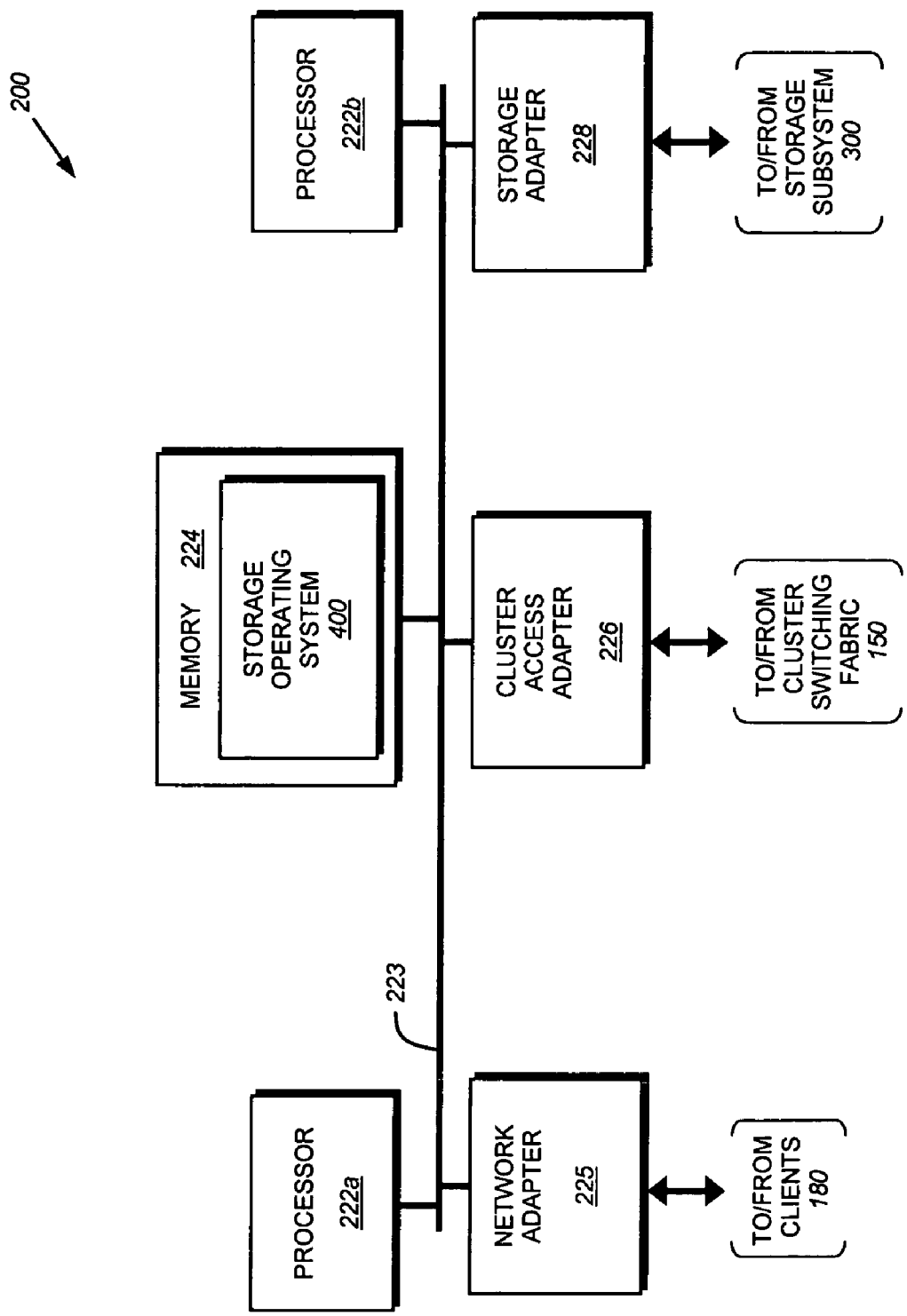
FIG. 2 is a schematic block diagram of a node that may be advantageously used in accordance with an embodiment of the present invention.

FIG. 2 is a schematic block diagram of a node 200 that is illustratively embodied as a storage system server comprising a plurality of processors 222, a memory 224, a network adapter 225, a cluster access adapter 226 and a storage adapter 228 interconnected by a system bus 223. The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein.

Each node 200 is illustratively embodied as a dual processor server system executing a storage operating system 300 that provides a file system configured to logically organize the information as a hierarchical structure of named directories and files on storage subsystem 300. However, it will be apparent to those of ordinary skill in the art that the node 200 may alternatively comprise a single or more than two-processor system. Illustratively, one processor 222a executes the functions of the N-blade 110 on the node, while the other processor 222b executes the functions of the D-blade 120.

In the illustrative embodiment, the memory 224 comprises storage locations that are addressable by the processors and adapters for storing software program code and data structures associated with the present invention. The processor and adapters may, in turn, comprise processing elements and/or logic circuitry configured to execute the software code and manipulate the data structures. The storage operating system 400, portions of which are typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the inventive system and method described herein.

The network adapter 225 comprises a plurality of ports adapted to couple the node 200 to one or more clients 180 over point-to-point links, wide area networks, virtual private networks implemented over a public network (Internet) or a shared local area network, hereinafter referred to as an Ethernet computer network 140. Therefore, the network adapter 225 may comprise a network interface card (NIC) having the mechanical, electrical and signaling circuitry needed to connect the node to the network. For such a network attached storage (NAS) based network environment, the clients are configured to access information stored on the node 200 as files. The clients 180 communicate with each node over network 140 by exchanging discrete frames or packets of data according to pre-defined protocols, such as the Transmission Control Protocol/Internet Protocol (TCP/IP).

The storage adapter 228 cooperates with the storage operating system 400 executing on the node 200 to access information requested by the clients. The information may be stored on disks or other similar media adapted to store information. The storage adapter comprises a plurality of ports having input/output (I/O) interface circuitry that couples to the disks over an I/O interconnect arrangement, such as a conventional high-performance, Fibre Channel (FC) link topology. The information is retrieved by the storage adapter and, if necessary, processed by processor 222 (or adapter 228 itself) prior to being forwarded over the system bus 223 to the network adapter 225 where the information is formatted into packets or messages and returned to the clients.

Figure 3:
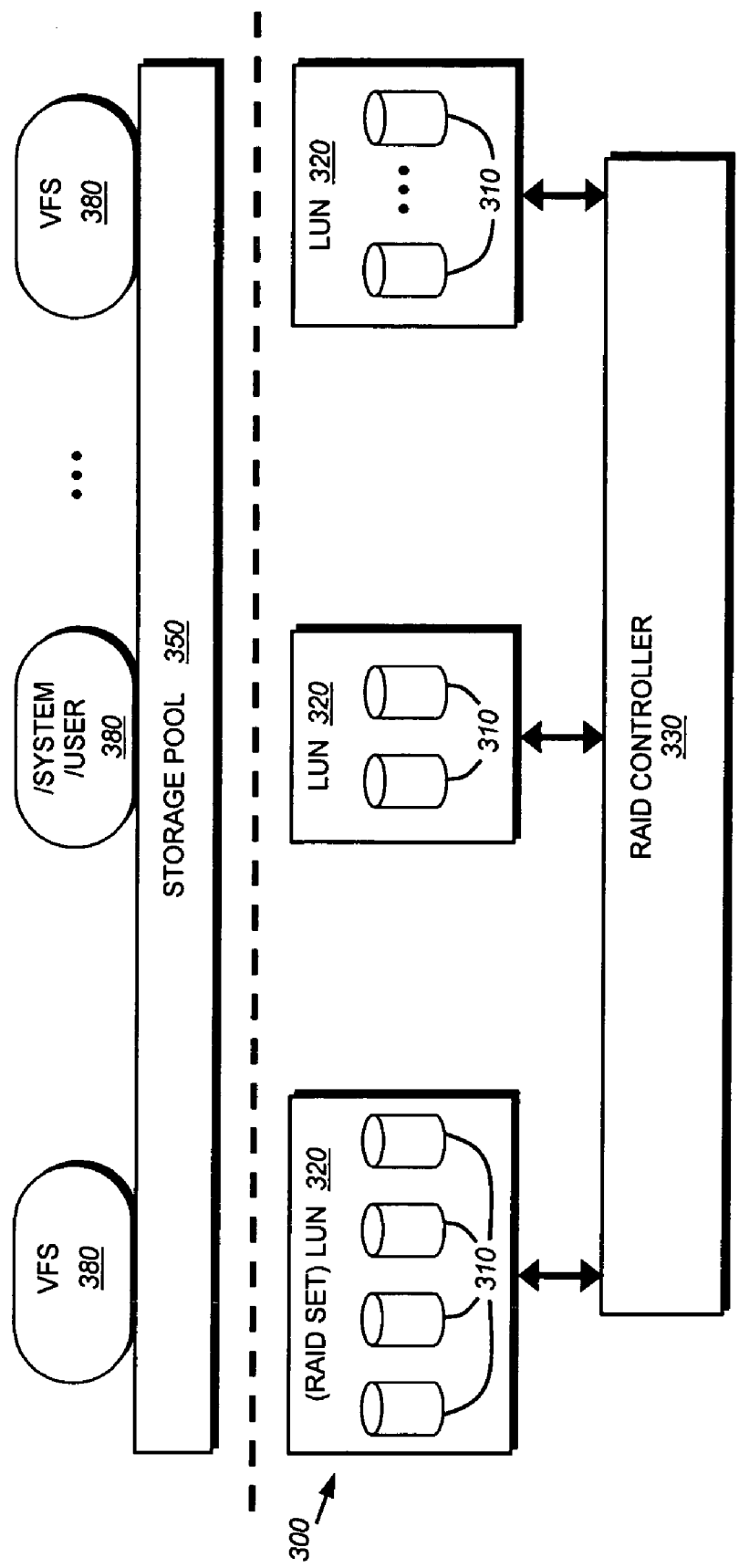
FIG. 3 is a schematic block diagram illustrating the storage subsystem that may be advantageously used in accordance with an embodiment of the present invention.

FIG. 3 is a schematic block diagram illustrating the storage subsystem 300 that may be advantageously used with the present invention. Storage of information on the storage subsystem 300 is illustratively implemented as a plurality of storage disks 310 defining an overall logical arrangement of disk space. The disks may be further organized as one or more groups or sets of Redundant Array of Independent (or Inexpensive) Disks (RAID). In alternate embodiments, other implementations, such as just a bunch of disks (JBOD) may be utilized in accordance with the principles of the present invention. RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails. It will be apparent to those skilled in the art that other redundancy techniques, such as mirroring, may used in accordance with the present invention.

Each RAID set is illustratively configured by one or more RAID controllers 330. The RAID controller 330 exports a RAID set as a logical unit number (LUN 320) to the D-blade 120, which writes and reads blocks to and from the LUN 320. One or more LUNs are illustratively organized as a storage pool 350, wherein each storage pool 350 is "owned" by a D-blade 120 in the cluster 100. Each storage pool 350 is further organized as a plurality of virtual file systems (VFSs 380), each of which is also owned by the D-blade. Each VFS 380 may be organized within the storage pool according to a hierarchical policy that, among other things, allows the VFS to be dynamically moved among nodes of the cluster, thereby enabling the storage pool 350 to grow and shrink dynamically (on the fly).

In the illustrative embodiment, a VFS 380 is synonymous with a volume and comprises a root directory, as well as a number of subdirectories and files. A group of VFSs may be composed into a larger namespace. For example, a root directory ("/") may be contained within a root VFS ("root.vs0"), which is the VFS that begins a translation process from a pathname associated with an incoming data access request to actual data (file) in a file system, such as the SpinFS file system. The root VFS may contain a directory ("system") or a mount point ("user"). A mount point is a SpinFS object used to "vector off" to another VFS and which contains the name of that vectored VFS. The file system may comprise one or more VFSs that are "stitched together" by mount point objects.

C. Storage Operating System

To facilitate access to the disks 310 and information stored thereon, the storage operating system 400 implements a write-anywhere file system, such as the SpinFS file system, which logically organizes the information as a hierarchical structure of named directories and files on the disks. However, it is expressly contemplated that any appropriate storage operating system, including a write in-place file system, may be enhanced for use in accordance with the inventive principles described herein. Each "on-disk" file may be implemented as set of disk blocks configured to store information, such as data, whereas the directory may be implemented as a specially formatted file in which names and links to other files and directories are stored.

As used herein, the term "storage operating system" generally refers to the computer-executable code operable on a computer that manages data access and may, in the case of a node 200, implement data access semantics of a general-purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the inventive system and method described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 4:
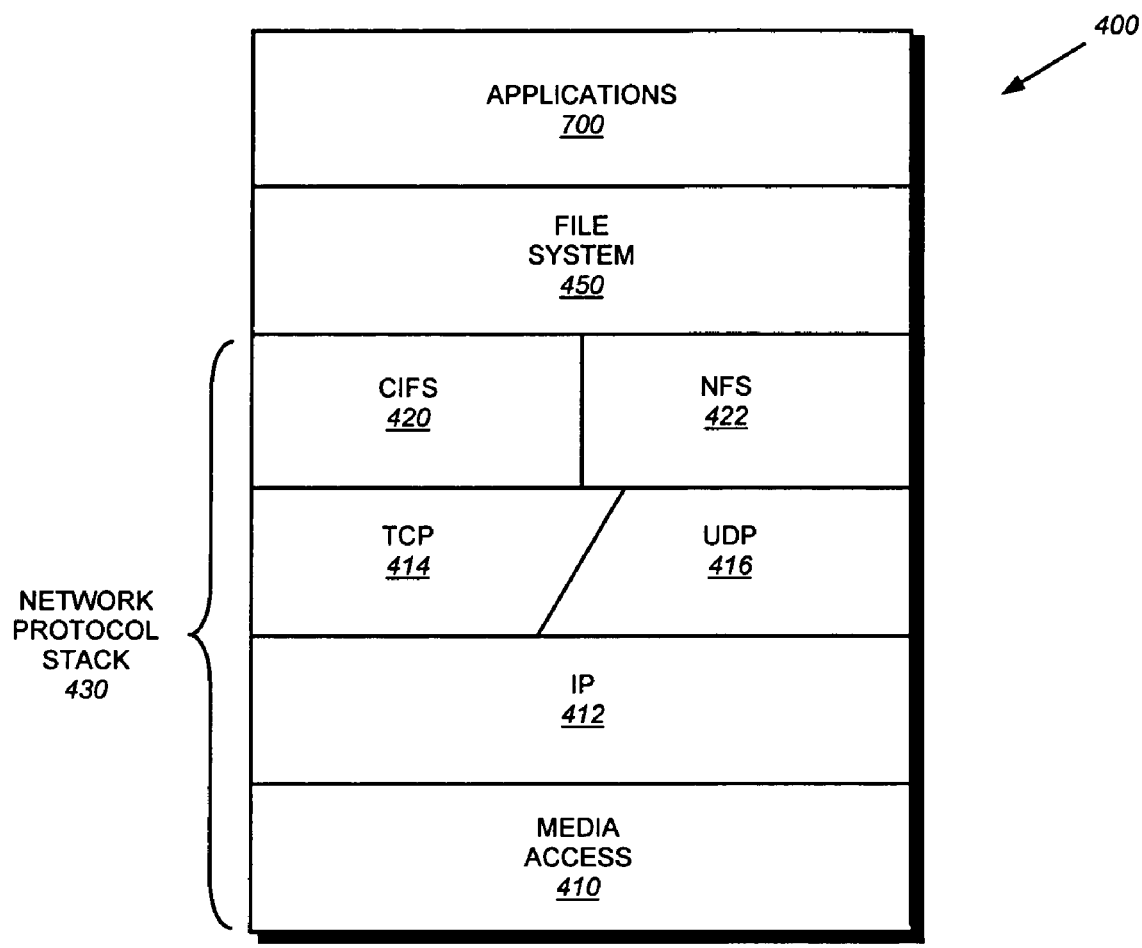
FIG. 4 is a partial schematic block diagram of a storage operating system that may be advantageously used in accordance with an embodiment of the present invention.

FIG. 4 is a partial schematic block diagram of the storage operating system 400 that may be advantageously used with the present invention. The storage operating system comprises a series of software layers organized to form an integrated network protocol stack 430 that provides a data path for clients to access information stored on the node 200 using file access protocols. The protocol stack includes a media access layer 410 of network drivers (e.g., gigabit Ethernet drivers) that interfaces to network protocol layers, such as the IP layer 412 and its supporting transport mechanisms, the TCP layer 414 and the User Datagram Protocol (UDP) layer 416. A file system protocol layer provides multi-protocol file access to a file system 450 (the SpinFS file system) and, thus, includes support for the CIFS protocol 220 and the NFS protocol 222. As described further herein, a plurality of management processes executes as user mode applications 700.

In the illustrative embodiment, the processors 222 share various resources of the node 200, including the storage operating system 400. To that end, the N-blade 110 executes the network protocol stack 430 of the operating system 400 to thereby perform protocol termination with respect to a client issuing incoming NFS/CIFS file access request packets over the network 140. The NFS/CIFS layers of the network protocol stack function as NFS/CIFS servers 422, 420 that translate NFS/CIFS requests from a client into SpinFS protocol requests used for communication with the D-blade 120. The SpinFS protocol is a file system protocol that provides operations related to those operations contained within the incoming file access packets. Local communication between an N-blade and D-blade of a node is preferably effected through the use of message passing between the blades, while remote communication between an N-blade and D-blade of different nodes occurs over the cluster switching fabric 150.

Specifically, the NFS and CIFS servers of an N-blade 110 convert incoming file access (NFS and CIFS) requests into SpinFS primitive operations contained within SpinFS packets (requests) that are processed by the D-blades 120 of the cluster 100. Each D-blade provides a disk interface function through execution of the SpinFS file system 450. In the illustrative cluster 100, the file systems 450 cooperate to provide a single SpinFS file system image across all of the D-blades in the cluster. Thus, any network port of an N-blade that receives a client request can access any file within the single file system image located on any D-blade of the cluster.

Figure 5:
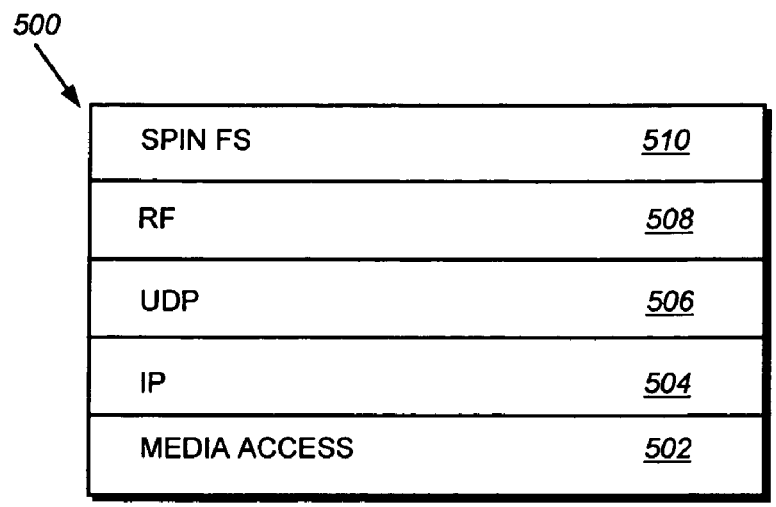
FIG. 5 is a schematic block diagram illustrating the format of a SpinFS request that may be advantageously used in accordance with an embodiment of the present invention.

FIG. 5 is a schematic block diagram illustrating the format of a SpinFS request 500 that illustratively includes a media access layer 502, an IP layer 504, a UDP layer 506, an RF layer 608 and a SpinFS protocol layer 510. As noted, the SpinFS protocol 610 is a file system protocol that provides operations, related to those operations contained within incoming file access packets, to access files stored on the cluster 100. Illustratively, the SpinFS protocol 510 is datagram based and, as such, involves transmission of packets or "envelopes" in a reliable manner from a source (e.g., an N-blade) to a destination (e.g., a D-blade). The RF layer 508 implements a reliable transport protocol that is adapted to process such envelopes in accordance with a connectionless protocol, such as UDP 506.

Figure 6:
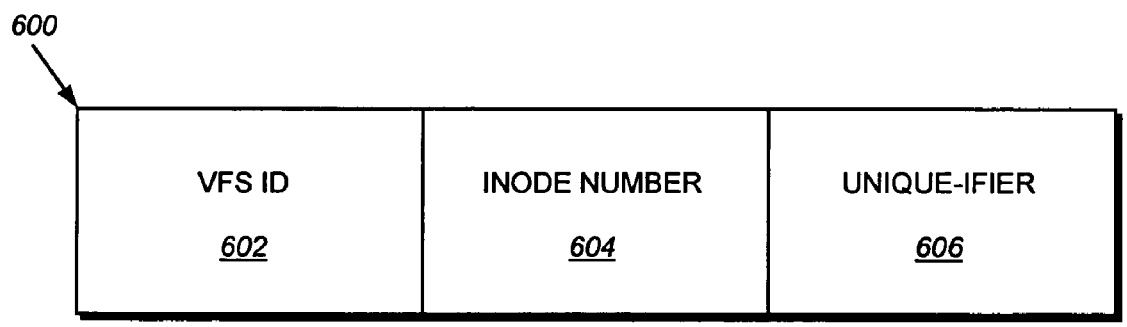
FIG. 6 is a schematic block diagram illustrating the format of a file handle that may be advantageously used in accordance with an embodiment of the present invention.

Files are accessed in the SpinFS file system 450 using a file handle. FIG. 6 is a schematic block diagram illustrating the format of a file handle 700 including a VFS ID field 602, an inode number field 604 and a unique-ifier field 606. The VFS ID field 602 contains an identifier of a VFS that is unique (global) within the entire cluster 100. The inode number field 604 contains an inode number of a particular inode within an inode file of a particular VFS. The unique-ifier field 606 contains a monotonically increasing number that uniquely identifies the file handle 600, particularly in the case where an inode number has been deleted, reused and reassigned to a new file. The unique-ifier distinguishes that reused inode number in a particular VFS from a potentially previous use of those fields.

Figure 7:
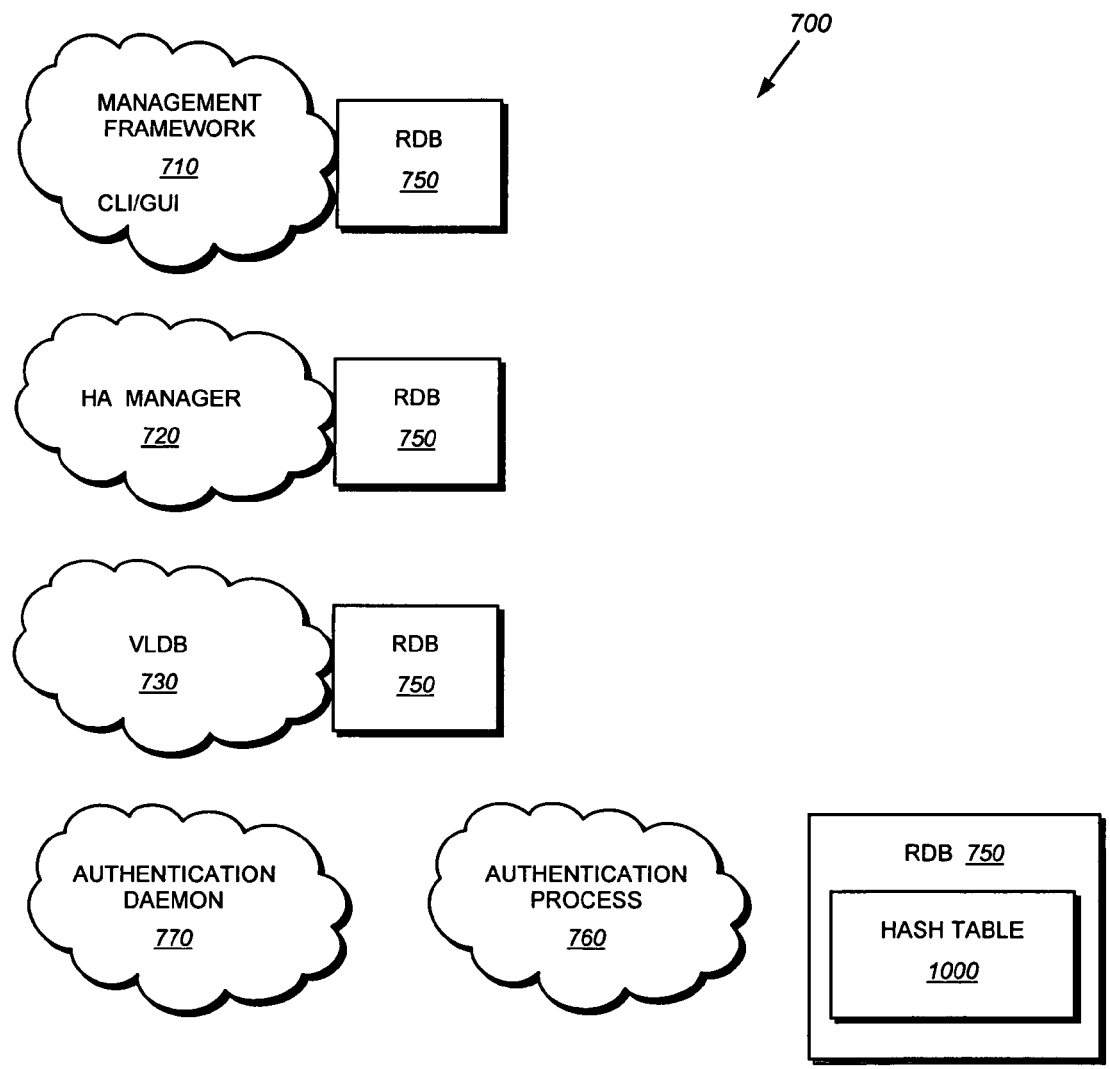
FIG. 7 is a schematic block diagram illustrating a collection of management processes that may be advantageously used in accordance with an embodiment of the present invention.

FIG. 7 is a schematic block diagram illustrating a collection of management processes that execute as user mode applications 700 on the storage operating system 400. The management processes include a management framework process 710, a high availability manager (HA Mgr) process 720, a VFS location database (VLDB) process 830, an authentication process 760, a server process, e.g., an authentication daemon 770, and a replicated database (RDB) process 750. The management framework 810 provides a user interface via a command line interface (CLI) and/or graphical user interface (GUI). The management framework is illustratively based on a conventional common interface model (CIM) object manager that provides the entity to which users/system administrators interact with a node 200 in order to manage the cluster 100.

The HA Mgr 720 manages all network addresses (IP addresses) of all nodes 200 on a cluster-wide basis. For example, assume a network adapter 225 having two IP addresses (IP1 and IP2) on a node fails. The HA Mgr 720 relocates those two IP addresses onto another N-blade of a node within the cluster to thereby enable clients to transparently survive the failure of an adapter (interface) on an N-blade 110. The relocation (repositioning) of IP addresses within the cluster is dependent upon configuration information provided by a system administrator. The HA Mgr 720 is also responsible for functions such as monitoring an uninterrupted power supply (UPS) and notifying the D-blade to write its data to persistent storage when a power supply issue arises within the cluster.

The VLDB 730 is a database process that tracks the locations of various storage components (e.g., a VFS) within the cluster 100 to thereby facilitate routing of requests throughout the cluster. In the illustrative embodiment, the N-blade 110 of each node has a look up table that maps the VS ID 602 of a file handle 600 to a D-blade 500 that "owns" (is running) the VFS 380 within the cluster. The VLDB provides the contents of the look up table by, among other things, keeping track of the locations of the VFSs 380 within the cluster. The VLDB has a remote procedure call (RPC) interface, e.g., a Sun RPC interface, which allows the N-blade 110 to query the VLDB 730. When encountering a VFS ID 602 that is not stored in its mapping table, the N-blade sends an RPC to the VLDB process. In response, the VLDB 730 returns to the N-blade the appropriate mapping information, including an identifier of the D-blade that owns the VFS. The N-blade caches the information in its look up table and uses the D-blade ID to forward the incoming request to the appropriate VFS 380.

The authentication daemon 770 implements the sidecar authentication mechanism of the present invention, as described further below. Generally, the authentication daemon receives authentication (e.g., kerberos) tickets from a client authentication program (CAP) of a client and generates novel storage system credentials, e.g., SpinFS credentials in response to those tickets being verified by the authentication process 760. The authentication process 760 provides a set of functions for performing the appropriate cryptographic procedures to validate tickets (credentials). For example, the authentication process 760 may implement the cryptographic functions necessary to process Kerberos tickets. The authentication process 760 may be generalized as a set of functions that are callable by other application programs and/or daemons to implement various authentication routines.

All of these management processes have interfaces to (are closely coupled to) the RDB 750. The RDB comprises a library that provides a persistent object store (storing of objects) pertaining to configuration information and status throughout the cluster. Notably, the RDB 750 is a shared database that is identical (has an identical image) on all nodes 200 of the cluster 100. For example, the HA Mgr 820 uses the RDB library 750 to monitor the status of the IP addresses within the cluster. At system startup, each node 200 records the status/state of its interfaces and IP addresses (those IP addresses it "owns") into the RDB database.

Operationally, requests are issued by clients 180 and received at the network protocol stack 430 of an N-blade 110 within a node 200 of the cluster 100. The request is parsed through the network protocol stack to the appropriate NFS/CIFS server, where the specified VFS 380 (and file), along with the appropriate D-blade 120 that "owns" that VFS, are determined. The appropriate server then translates the incoming request into a SpinFS request 500 that is routed to the D-blade. The D-blade receives the SpinFS request and apportions it into a part that is relevant to the requested file, as well as a part that is relevant to specific access (read/write) allocation with respect to blocks on the disk. All functions and interactions between the N-blade 110 and D-blade are coordinated on a cluster-wide basis through the collection of management processes and the RDB library user mode applications 700.

Figure 8:
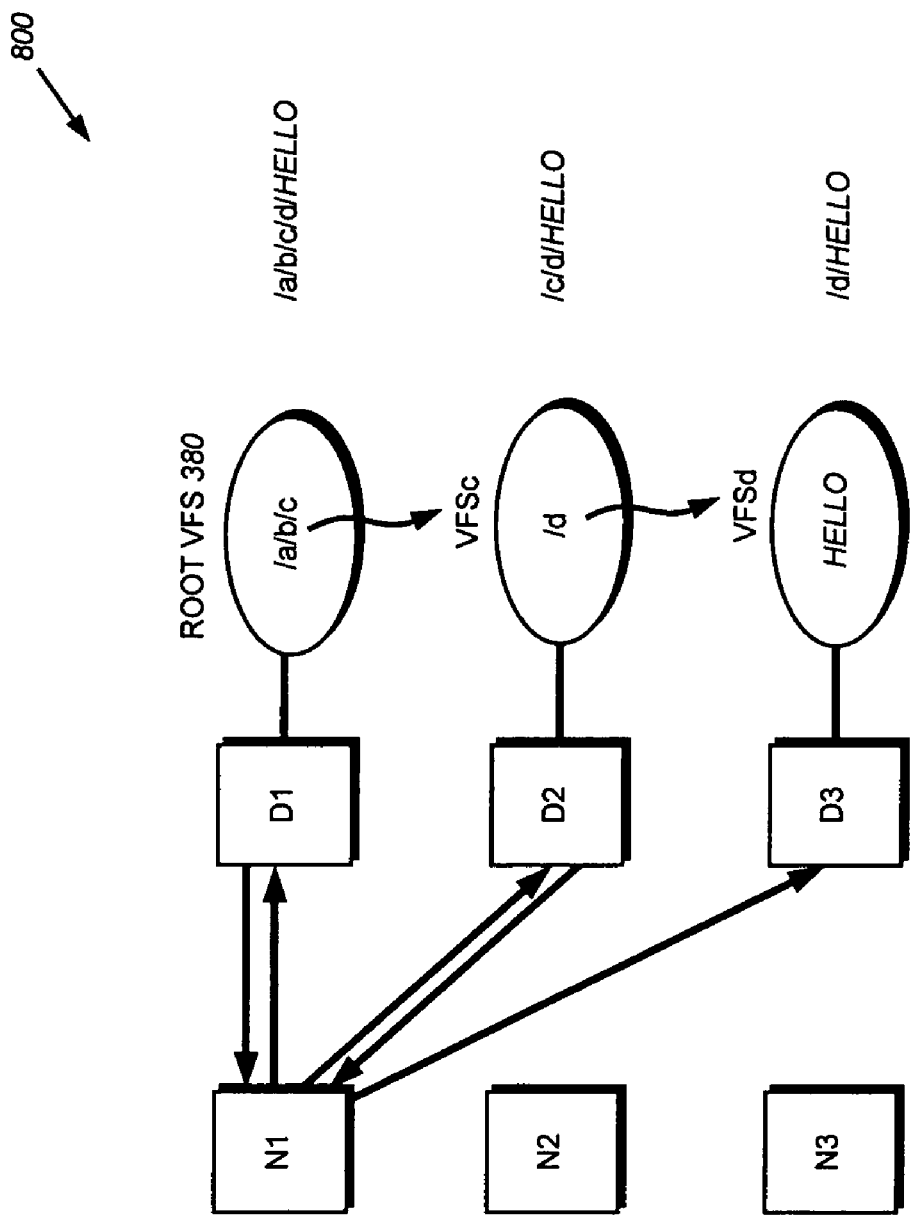
FIG. 8 is a schematic block diagram illustrating a distributed file system arrangement for processing a file access request in accordance with an embodiment of the present invention.

FIG. 8 is a schematic block diagram illustrating a distributed file system (SpinFS) arrangement 800 for processing a file access request at nodes 200 of the cluster 100. Assume a CIFS request packet specifying an operation directed to a file having a specified pathname is received at an N-blade 110 of a node 200. Specifically, the CIFS operation attempts to open a file having a pathname /a/b/c/d/Hello. The CIFS server 420 on the N-blade 110 performs a series of lookup calls on the various components of the pathname. Broadly stated, every virtual server has a root VFS 380 represented by the first "/" in the pathname. The N-blade 110 performs a lookup operation into the lookup table to determine the D-blade "owner" of the root VFS and, if that information is not present in the lookup table, forwards a RPC request to the VLDB 730 in order to obtain that location information. Upon identifying the D1 D-blade owner of the root VFS, the N-blade 110 forwards the request to D1, which then parses the various components of the pathname.

Assume that only a/b/ (e.g., directories) of the pathname are present within the root VFS. According to the SpinFS protocol, the D-blade parses the pathname up to a/b/, and then returns (to the N-blade) the D-blade ID (e.g., D2) of the subsequent (next) D-blade that owns the next portion (e.g., c/) of the pathname. Assume that D3 is the D-blade that owns the subsequent portion of the pathname (d/Hello). Assume further that c and d are mount point objects used to vector off to the VFS that owns file Hello. Thus, the root VFS has directories a/b/ and mount point c that points to VFS c which has (in its top level) mount point d that points to VFS d that contains file Hello. Note that each mount point may signal the need to consult the VLDB 730 to determine which D-blade owns the VFS and, thus, to which D-blade the request should be routed.

The N-blade (N1) that receives the request initially forwards it to D-blade D1, which send a response back to N1 indicating how much of the pathname it was able to parse. In addition, D1 sends the ID of D-blade D2 which can parse the next portion of the pathname. N-blade N1 then sends to D-blade D2 the pathname c/d/Hello and D2 returns to N1 an indication that it can parse up to c/, along with the D-blade ID of D3 which can parse the remaining part of the pathname. N1 then sends the remaining portion of the pathname to D3 which then accesses the file Hello in VFS d. Note that the distributed file system arrangement 800 is performed in various parts of the cluster architecture including the N-blade 110, the D-blade, the VLDB 730 and the management framework 710.

D. Sidecar Authentication Mechanism

The present invention provides a lightweight "side car" authentication mechanism that improves the security of file-level protocol access in a storage system environment. As used herein, the term "sidecar authentication mechanism" denotes the use of a client authentication program (CAP) to transmit an appropriate authentication ticket from the client to a server process running on the storage system without using the file-level protocol. The server process interacts with an authentication process to authenticate the client request and construct a storage system credential from the authentication ticket. The storage system credential is thereafter used to service further requests from the client (until the credential expires) to thereby improve authentication of such file-level protocol access requests. In addition, the server process may include an authentication daemon executing on the node and the file level protocol is illustratively the NFS protocol.

Operationally, the client first acquires an authentication ticket, such as a Kerberos credential, using a conventional authentication technique. The client then utilizes the CAP to transmit the Kerberos ticket to the authentication daemon, which uses that credential to generate the storage system credential, e.g., a SpinFS credential, and places this generated credential in a cache. The cache is maintained in a memory of the node and is also propagated to a replicated database (RDB), which is shared among all nodes of a is cluster. Notably, the SpinFS credentials are accessed in the cache by authentication tuples, each of which comprises a UID, a network address of the client and a virtual server id (VSID). Once the SpinFS credential has been generated and stored in an appropriate entry in the cache, future NFS requests issued from the network address of the client utilize the cached credential instead of a conventional NFS credential included within the requests.

Specifically, upon receipt of the data access request from the client, a file protocol module, e.g. an NFS server executing on the node, acquires the appropriate SpinFS credential by indexing into the cache using the authentication tuple associated with the UID and network address of the received request. The NFS server then processes the data access request using the credential. If no credential is found in the cache, the request may either be denied or may be processed using a conventional unauthenticated NFS technique. In accordance with one embodiment of the present invention, an authentication level or strength value is assigned to each data access request. Unauthenticated requests are assigned a minimum authentication strength value and, in the illustrative embodiment, data access requests utilizing the sidecar mechanism of the present invention are assigned an authentication strength value that is higher than the unauthenticated NFS technique but lower than other strongly-authenticated access mechanisms. Administrators may use various system configurations to limit access to users based on their authentication strength.

Figure 9:
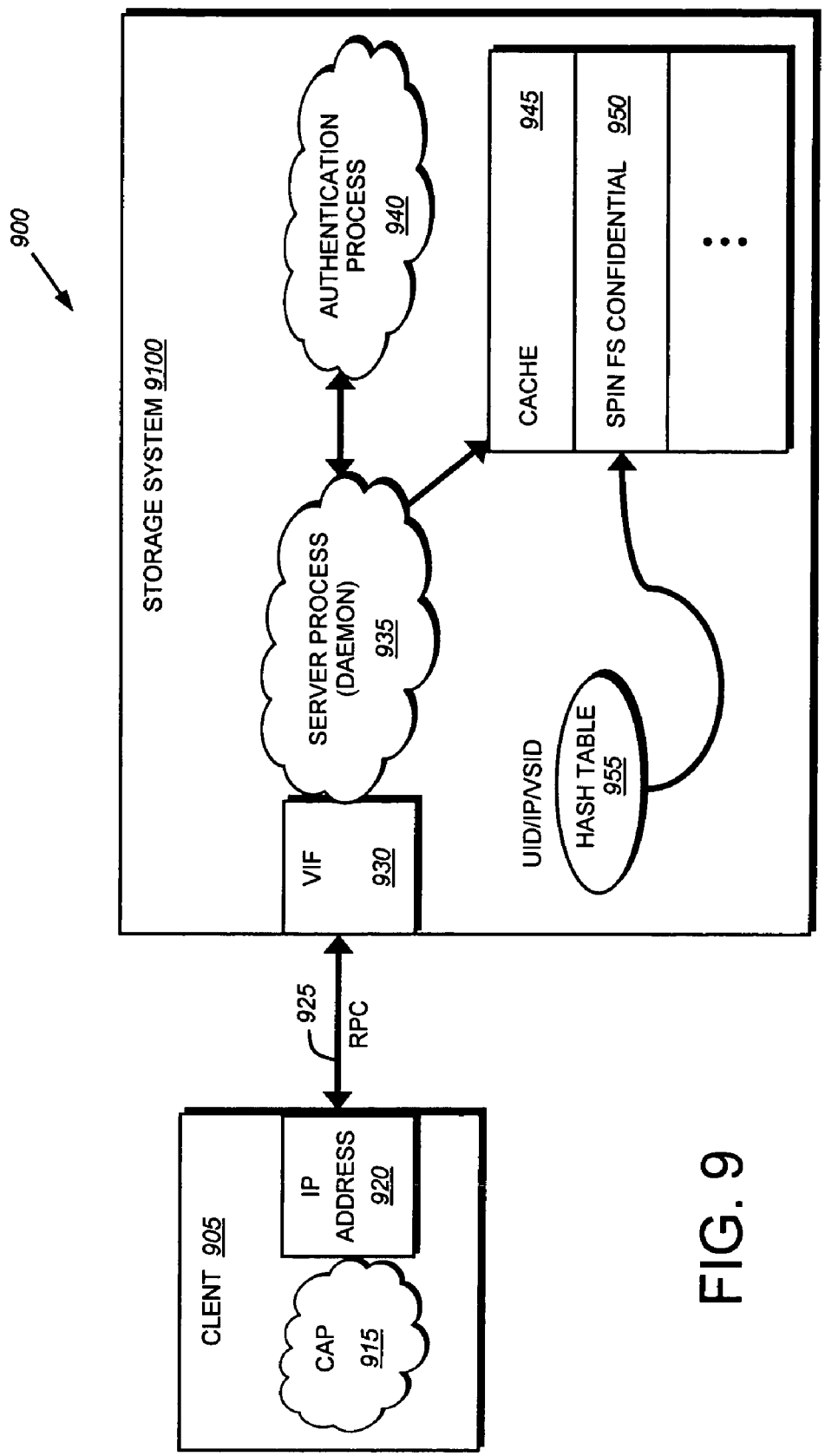
FIG. 9 is a schematic block diagram of an exemplary storage system environment in accordance with an embodiment of the present invention.

FIG. 9 is a schematic block diagram of an exemplary storage system environment 900 showing aspects of the present invention. A client 905 includes a CAP 915 that interfaces with the server process 935 via remote procedure calls (RPCs) over network 925. As noted, the CAP will transmit a UID, an authentication ticket and an network address, such as the IP address 920 of the client 905, to the server process 935. The server process 935, which may be monitoring a specific virtual interface (VIF) 930, described further below, for RPCs, utilizes the authentication process 940 to authenticate the authentication ticket and then generates a file system (SpinFS) credential 950, which is placed in a cache 945. The credential 950 is placed in the cache 945 indexed by an authentication tuple comprising of the UID, network (IP) address and virtual server ID (VSID) that is hashed to located an index value in a hash table 955. A client 905 may transmit a list of multiple network addresses to the server process 935. In such a case, the server process 935 will generate a plurality of authentication tuples, specifically one per network address received.

In the illustrative embodiment, a file server may execute multiple virtual servers on the single physical platform. Examples of virtual servers are described in detail in U.S. patent application Ser. No. 10/035,664, entitled ARCHITECTURE FOR CREATING AND MAINTAINING VIRTUAL FILERS ON A FILER, by Mark Muhlestein, et al. Each virtual server has a unique VSID associated with it. From a client's perspective each virtual server is a separate physical node. Thus, a node may have two virtual servers executing on it. A particular user may have a credential with only one of the virtual servers executing on the physical spin server or may have differing credentials on each of the virtual servers. Each virtual server may have one or more virtual interfaces (VIFs) associated therewith. A VIF comprises a network port that is assigned to the virtual server.

Figure 10:
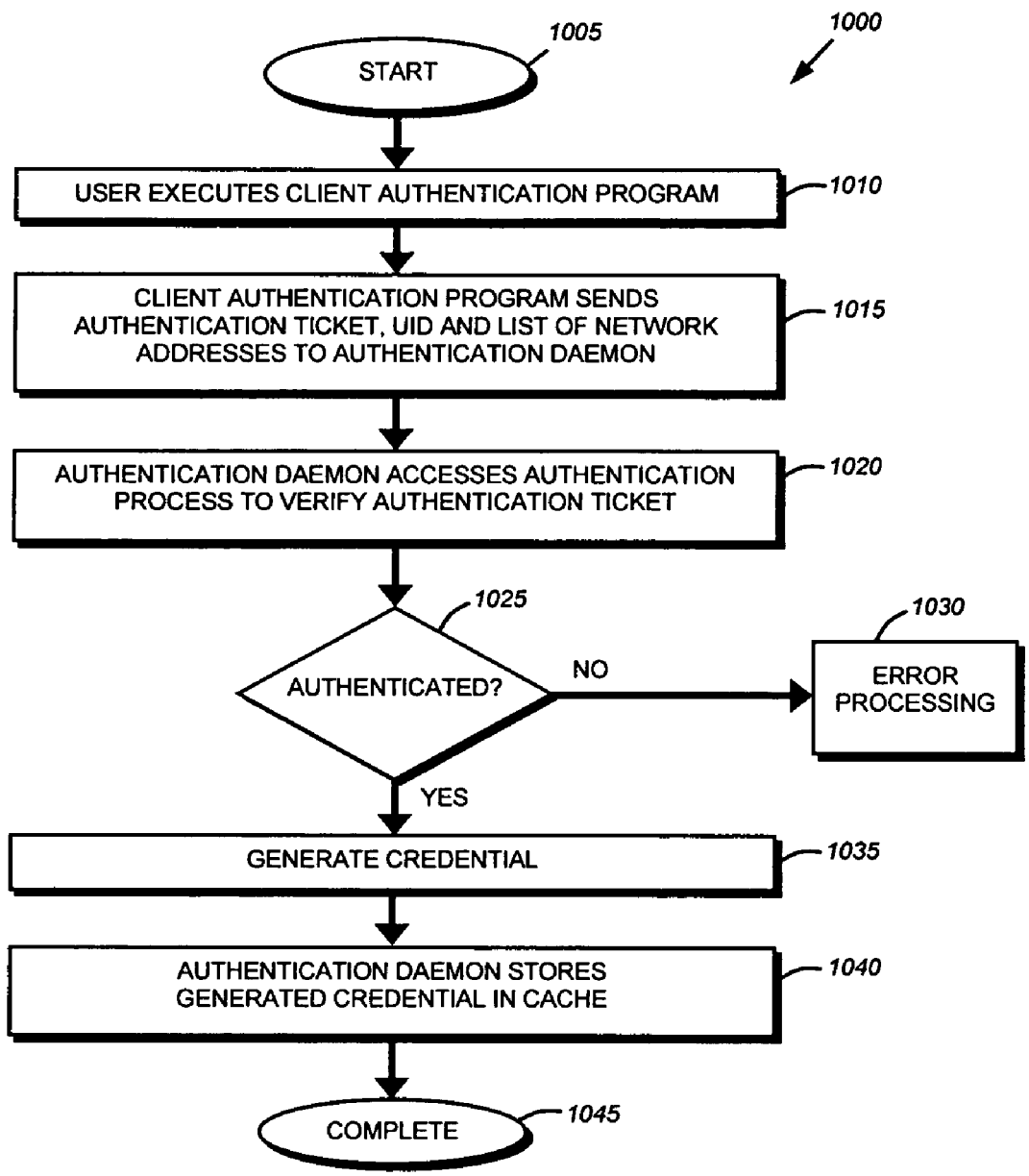
FIG. 10 is a flowchart detailing the steps of a procedure for initializing an authentication tuple in accordance with an embodiment of the present invention.

FIG. 10 is a flowchart detailing the steps of a procedure 1000 for initializing an authentication tuple in accordance with an embodiment of the present invention. The procedure starts in step 1005 and proceeds to step 1010 where the user executes a client authentication program. The client authentication program (CAP) may be a command line interface (CLI) program executing on the client's computer. Alternately, the functionality of the CAP may be implemented over a multipurpose protocol that is protected by a multipurpose security protocol. In an illustrative embodiment, the multipurpose protocol is the Hyper Text Transfer Protocol (HTTP) and the multipurpose security protocol is the Secure Sockets Layer (SSL) protocol. In alternate embodiments, the multipurpose security protocol may comprise the Transport Layer Security (TLS) protocol. However, it should be noted that other multipurpose protocols and multipurpose security protocols may be utilized in alternate embodiments of the present invention. Typically, the multipurpose protocol includes a client side agent, such as a world wide web browser in the example of the HTTP protocol. The client side agent may implement a graphical user interface (GUI) or a text based interface. The user executes the CAP using, in the example of a CLI command, command line arguments identifying a number of network addresses to be associated with the client.

Then, in step 1015, the CAP sends to the authentication daemon an authentication ticket, UID and a list of network addresses to be associated with the credential. This may be accomplished using conventional RPC techniques. The authentication ticket may be, for example, a Kerberos ticket identifying the user. In an alternate embodiment, the authentication ticket comprises a user identifier (UID) and a password combination that is encrypted using a multipurpose security protocol, such as SSL. Upon receipt of the authentication ticket, UID and list of network addresses, the authentication daemon then, in step 1020, accesses the authentication process executing within the file server to verify the authentication ticket. A determination is then made whether or not the ticket is properly authenticated. If it is not properly authenticated, the procedure branches to step 1030 where appropriate error processing occurs.

Otherwise, the procedure continues to step 1035, where the authentication daemon generates a file system credential associated with the received UID and authentication ticket. The authentication daemon then, in step 1040, stores the generated credential in an in-memory hash table and also passes the generated authentication tuples to a replicated database (RDB) for use by other nodes in the cluster. Illustratively, the generated credential is stored in the cache indexed by an authentication tuple comprising of a UID, network address and VSID. If a user specifies multiple network addresses, multiple authentication tuples are generated (one for each network address) and each references the same file system credential. By utilizing the RDB, the authentication daemon may distribute the authentication tuples to all nodes in the cluster. The procedure then completes in step 1045.

Figure 11:
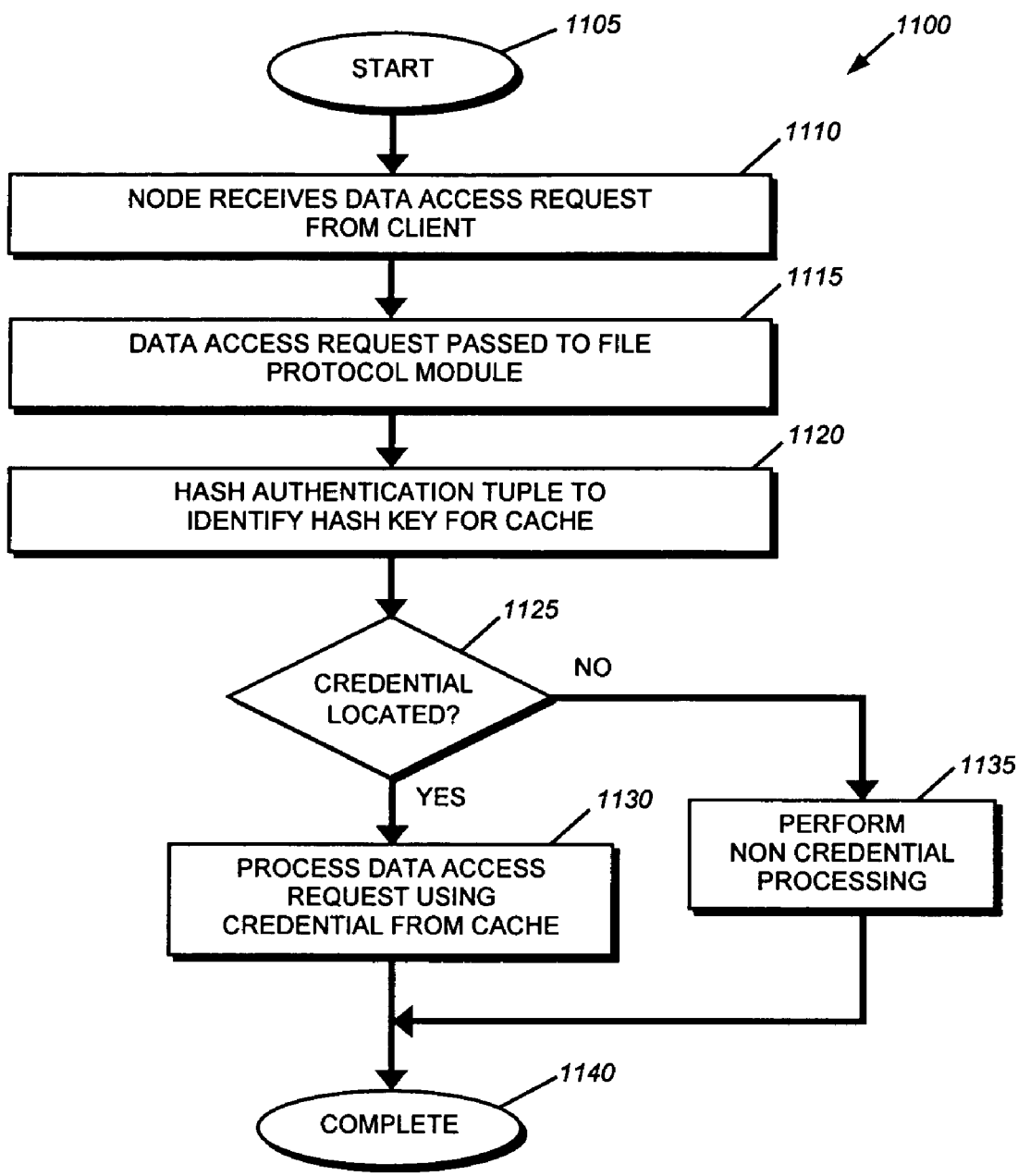
FIG. 11 is a flowchart detailing the steps of a procedure for processing data access requests using authentication tuples in accordance with an embodiment of the present invention.

FIG. 11 is a flowchart detailing the steps of an illustrative procedure 1100 for processing data access requests in accordance with an embodiment of the present invention. The procedure starts in step 1105 and continues to step 1110 where a file server receives a data access request from a client. Next, in step 1115, the data access request is passed to the appropriate file protocol module. In the illustrative embodiment, the file protocol module is the NFS server 422 executing in the storage operating system. Then, in step 1120, the file protocol module hashes the authentication tuple (UID, network address and VSID) to generate a hash key that is utilized to locate the file system credential. Illustratively, the kernel cache is organized as an array of pointers to cache entries. The hash key generated by hashing the authentication tuple points to a pointer, which, in turn, points to the head of a chain of entries whose hash values are identical. Each entry includes a next entry pointer, so that entries are chained into lists, which permits collisions to be resolved by inserting the entry into the chain pointed to by the relevant hash table entry.

Next, a determination is made if the appropriate credential has been located (in step 1125). If an appropriate credential has been located, the procedure, in step 1130, processes the data access request using the credential. The procedure then completes in step 1140. However, if in step 1125, no credential is located, the procedure branches to step 1135 where noncredential processing is performed. In one embodiment this may include processing the data access request using the asserted UID/GID as a conventional NFS request. In alternate embodiments the request may be denied and an error message returned to the client.

E. Other Embodiments

In alternate embodiments, the CAP may be integrated into a client login process to transparently integrate the sidecar authentication mechanism into a storage environment. Such an implementation may be accomplished by, e.g., including appropriate scripting commands to execute the CAP with the appropriate options during the login process of a user. In another alternate embodiment, the CAP may remain resident in the client and refresh the server credential at set time periods if the user has remained logged into the client. This may be accomplished by the CAP resending the appropriate commands at a set time interval to the authentication daemon executing on the storage system.

On advantage of the use of the sidecar mechanism is the ability for a user to "loan" his credential to another user. This loaning may be accomplished by, e.g., a first user executing the CAP to associate his credential with the UID and network address of a second user. The storage system would then create a file system credential that associates the first user's credential with the second user's UID and network address. The second user would retain the authority of the first user for the lifetime of the file system credential. This permits, e.g., a system administrator to delegate authority to another user temporarily without making a permanent delegation.

To again summarize, the present invention is directed to a sidecar authentication mechanism for authenticating file-level protocols that are not strongly authenticated. A client executes a client authentication program (CAP), which transmits an authentication ticket, a UID and a list of network addresses to an authentication daemon executing on a file server. The authentication daemon verifies the authentication ticket and generates a file system credential for use in processing data access requests from the client. Upon receipt of a data access request, the file server utilizes the authentication tuple (comprising a UID, network address and virtual server ID) to locate the file system credential in a the cache. Once located, the file server utilizes the file system credential stored therein in processing the data access request.

The foregoing description has been directed to particular embodiments of this invention. It will be apparent, however, that other variations and modifications may be made to the described embodiments, with the attainment of some or all of their advantages. Additionally, the procedures or processes may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method for authenticating a file level protocol, the method comprising:
   receiving a data access request using the file level protocol;
   utilizing an authentication tuple to locate a file system credential;
   processing the received data access request utilizing the file system credential;
   generating the file system credential in response to a user executing a command on a client to transmit an authentication ticket and first UID to an authentication daemon executing within a server, the authentication ticket and first UID being transmitted over a protocol differing from the file level protocol.

2. The method of claim 1, further comprising:
   implementing the command using a multipurpose protocol protected with a multi-purpose security protocol.

3. The method of claim 2, further comprising:
   using a hypertext transfer protocol (HTTP) as the multipurpose protocol.

4. The method of claim 2, further comprising:
   using a secure sockets layer (SSL) protocol as the multipurpose security protocol.

5. The method of claim 2, further comprising:
   using a transport layer security (TLS) protocol as the multipurpose security protocol.

6. The method of claim 2, further comprising:
   including a client side agent, the client side agent including a graphical user interface in the multipurpose protocol.

7. The method of claim 6, further comprising:
   displaying the graphical user interface in a world wide web browser.

8. The method of claim 2, further comprising:
   including a client side agent in the multipurpose protocol, the client side agent including a text based interface.

9. The method of claim 8, further comprising:
   displaying the text based interface in a world wide web browser.

10. The method of claim 2, further comprising:
    including a second user identifier (UID) and a password in the authentic ticket, the second UID and password being encrypted via the multipurpose security protocol.

11. The method of claim 1, further comprising:
    implementing the command within a command line interface.

12. The method of claim 1, further comprising:
    including a Kerberos ticket in the authentic ticket.

13. The method of claim 1, further comprising:
    associating a first user with the authentication ticket and associating the first UID with a second user.

* * * * *

UNITED STATES PATENT AND TRADEMARK OFFICE
CERTIFICATE OF CORRECTION

| | | |
|---|---|---|
| PATENT NO. | : 7,519,813 B1 | Page 1 of 1 |
| APPLICATION NO. | : 10/910164 | |
| DATED | : April 14, 2009 | |
| INVENTOR(S) | : Benjamin T. H. Cox | |

It is certified that error appears in the above-identified patent and that said Letters Patent is hereby corrected as shown below:

In Col. 10, line 42 should read as follows:
-- (RBD), which is shared among all nodes of a ~~is~~ cluster. --.

Signed and Sealed this
Twenty-fourth Day of July, 2012

David J. Kappos
*Director of the United States Patent and Trademark Office*